US009120001B2

(12) United States Patent
Huang

(10) Patent No.: US 9,120,001 B2
(45) Date of Patent: Sep. 1, 2015

(54) SWIFTLY-ASSEMBLING COLLAPSIBLE GOAL AND SWIFTLY-ASSEMBLING COLLAPSIBLE PORTABLE FRAME

(71) Applicant: Husheng Huang, Shenzhen (CN)

(72) Inventor: Husheng Huang, Shenzhen (CN)

( * ) Notice: Subject to any disclaimer, the term of this patent is extended or adjusted under 35 U.S.C. 154(b) by 284 days.

(21) Appl. No.: 13/781,187

(22) Filed: Feb. 28, 2013

(65) Prior Publication Data

US 2014/0171233 A1    Jun. 19, 2014

(30) Foreign Application Priority Data

Dec. 18, 2012  (CN) .......................... 2012 1 0552231

(51) Int. Cl.
*A63B 63/00*   (2006.01)
*F16B 7/02*    (2006.01)

(52) U.S. Cl.
CPC ........... *A63B 63/004* (2013.01); *A63B 2210/50* (2013.01); *F16B 7/02* (2013.01); *Y10T 403/32254* (2015.01)

(58) Field of Classification Search
USPC .................... 273/406, 407, 408; 16/249, 250; 278/48, 49, 50, 51; 403/100
See application file for complete search history.

(56) References Cited

U.S. PATENT DOCUMENTS

| | | | | |
|---|---|---|---|---|
| 561,665 | A * | 6/1896 | Hubbell | 403/100 |
| 1,694,885 | A * | 12/1928 | Matheson | 5/312 |
| 6,371,873 | B1 * | 4/2002 | Wang | 473/478 |
| 8,104,141 | B2 * | 1/2012 | Yamashita | 16/239 |
| 2004/0036222 | A1 * | 2/2004 | Chou | 273/407 |
| 2006/0226607 | A1 * | 10/2006 | Chen | 273/407 |
| 2006/0264274 | A1 * | 11/2006 | Bryant et al. | 473/478 |
| 2007/0145688 | A1 * | 6/2007 | Caruso | 273/407 |
| 2011/0160005 | A1 * | 6/2011 | Chen | 473/476 |
| 2011/0201460 | A1 * | 8/2011 | Rigoli | 473/478 |
| 2012/0077629 | A1 * | 3/2012 | Cerasoli | 473/478 |
| 2012/0184399 | A1 * | 7/2012 | Reeves | 473/478 |
| 2014/0171233 | A1 * | 6/2014 | Huang | 473/478 |

* cited by examiner

*Primary Examiner* — Gene Kim
*Assistant Examiner* — M Chambers
(74) *Attorney, Agent, or Firm* — Tim Tingkang Xia, Esq.; Locke Lord LLP

(57) ABSTRACT

A swiftly-assembling collapsible goal and a portable frame are provided. The goal includes a plurality of poles engaged together to form a frame of the goal. Engaged poles are associated with each other with a hinge disposed at a corner region therebetween. One of two engaged poles is provided with a tenon protruding from a first end thereof and the other pole of the two engaged poles is provided with a mortise slot at a second end of the other pole facing toward the first end. The tenon defines a wedge-shaped slot along an axis of the pole. An insert pin is engaged to the tenon with a wedge-shaped rib engaged in the wedge-shaped slot. The insert pin has two tabs laterally extending from two side surfaces thereof. The pole with mortise slot defines two slits in two sidewalls which define the mortise slot, for respectively receiving the two ribs therein. The tenon and the insert pin are received in the mortise slot.

18 Claims, 4 Drawing Sheets

SWIFTLY-ASSEMBLING COLLAPSIBLE GOAL AND SWIFTLY-ASSEMBLING COLLAPSIBLE PORTABLE FRAME

CROSS-REFERENCE TO RELATED APPLICATIONS

This application claims the priority to Chinese Patent Application No. 201210552231.4, filed Dec. 18, 2012, which is hereby incorporated herein in their entireties by reference.

FIELD OF THE INVENTION

The present invention relates to frame devices and, more particularly to a swiftly-assembling collapsible goal and a swiftly-assembling collapsible portable frame.

BACKGROUND

At present, sports have become an important part of people's daily life. Specifically, a variety of sports and games confer pleasure on people's life. As we known, netted ball games, such as for example, football, hockey, ice hockey, tennis ball and so on, are prevailed in teenagers. Frame devices are typically used with these ball games. Especially, a netted goal is essentially required for having a soccer game and training.

In generally, these frame devices are in a collapsible or detachable form, typically with a hinge joint or a pivot joint. However, such a frame or goal readily falls apart when it is subjected to a sudden push or a body violence. Accordingly, this kind of frame is so loose that athletes feel too insecure to use it. In other cases, some goals are firmly assembled for overcoming above shortages, for example, utilizing rigid material (e.g., light metal or alloy) and complex joints. However, this would cause to user's too much inconvenience of disassembly and assembling. Further, it has been a tricky thing that these metal goals must satisfy current many kinds of directives, especially for example EU directive, even though only a little of metal material is applied in.

SUMMARY

In accordance with an aspect of an embodiment of the present invention, a swiftly-assembling collapsible goal is provided. The swiftly-assembling collapsible goal comprises a plurality of poles engaged together to form a frame of the goal. Engaged poles are associated with each other with a hinge disposed at a corner region therebetween. One of two engaged poles is provided with a tenon protruding from a first end thereof and the other pole of the two engaged poles is provided with a mortise slot at a second end of the other pole facing toward the first end. The tenon defines a wedge-shaped slot along an axis of the pole. An insert pin is engaged to the tenon with a wedge-shaped rib which extends from a bottom of the insert pin and is engaged in the wedge-shaped slot. The insert pin has two tabs laterally extending from two side surfaces thereof. The pole with mortise slot defines two slits in two sidewalls which defines the mortise slot. The two slits are configured for respectively receiving the two ribs therein. The tenon and the insert pin are received in the mortise slot.

In accordance with another aspect of an embodiment of the present invention, a swiftly-assembling collapsible portable frame is provided. The frame comprises a plurality of poles associated with each other with a hinge disposed at a corner region therebetween. One of two engaged poles is provided with a tenon protruding from a first end thereof and the other pole of the two engaged poles is provided with a mortise slot at a second end of the other pole facing toward the first end. The tenon defines a wedge-shaped slot along an axis of the pole having the tenon. An insert pin is engaged to the tenon with a wedge-shaped rib which extends from a bottom of the insert pin and is engaged in the wedge-shaped slot. The insert pin has two tabs laterally extending from two side surfaces thereof. The pole with mortise slot defines two slits in two sidewalls which define the mortise slot. The two slits are configured for respectively receiving the two ribs therein. The tenon and the insert pin are received in the mortise slot.

Accordingly, the poles are engaged with the tenon and the mortise slot and are further firmly secured together with the insert pin. The insert pin is engaged to the tenon with the wedge-shaped rib in the wedge-shaped slot of one pole and is engaged to the other pole with the two tabs inserted into the two slits. As such, the two poles are firmly engaged together without any shift or offset due to a restrain action of the pin so that the goal (and the frame) can keep its shape even when being subjected to a sudden push or body violence. Prior to assembling, the entire or part of the insert pin is kept to be drawn away from the wedge-shaped slot, and then the tenon optionally affixed with the pin is aimed and inserted into the mortise slot. Then the poles are wrenched to attain given sites, the insert pin is pushed back into the mortise slot, accordingly achieving the assembling of the goal or the frame. When collapsing the goal or the frame, the entire or part of insert pin is kept to be drawn away from the wedge-shaped slot, and then every pair of adjacent two poles is wrenched to be in an approximately overlapped-shape, and accordingly the goal or the frame is compacted.

Other objects, advantages and novel features of the present invention will become more apparent from the following detailed description when taken in conjunction with the accompanying drawings.

DETAILED DESCRIPTION OF THE PREFERRED EMBODIMENTS

Objects, advantages and embodiments of the present invention will be explained below in detail with reference to the accompanying drawings. However, it is to be appreciated that the following description of the embodiment(s) is merely exemplary in nature and is no way intended to limit the invention, its application, or uses.

Figure 1:
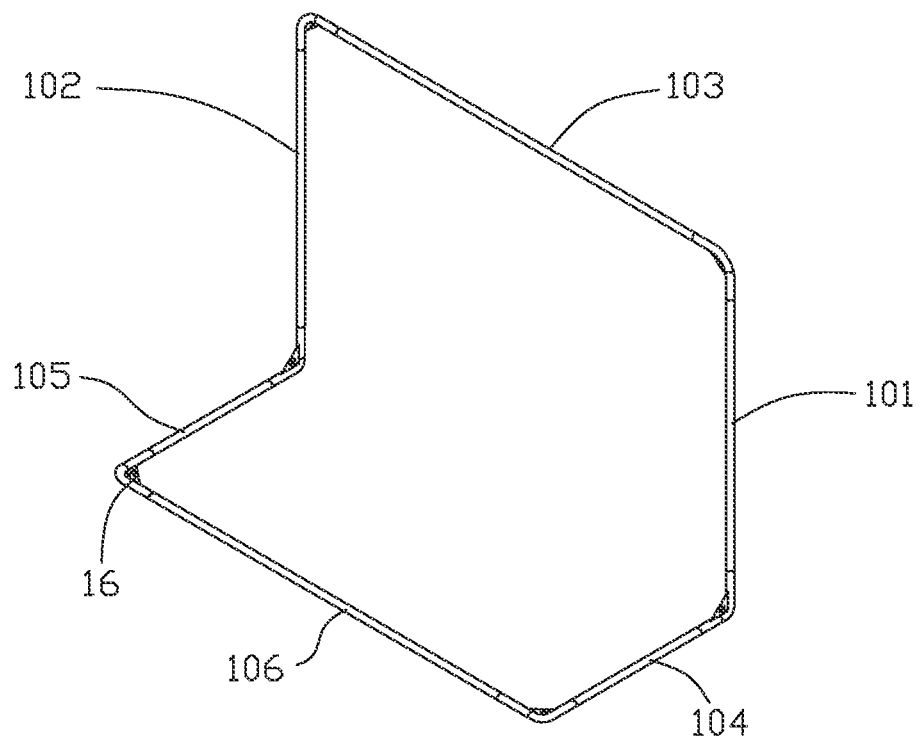
FIG. 1 is a schematic, isometric view of a swiftly-assembling collapsible portable frame according to a first embodiment of the present invention.
Figure 2:
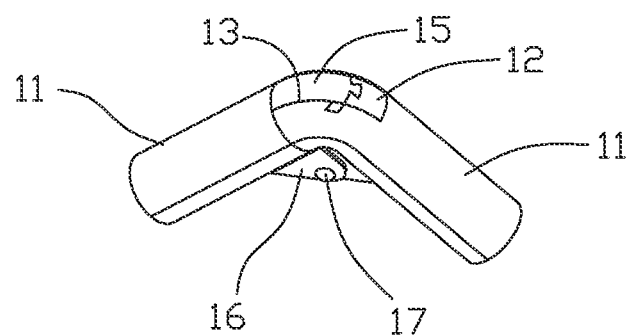
FIG. 2 is a schematic, enlarged view of a joint region between two engaged poles in FIG. 1.
Figure 3:
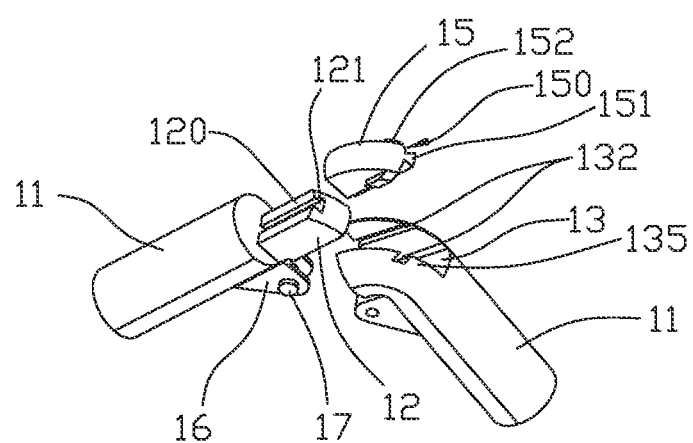
FIG. 3 is an exploded, enlarged view of the joint region in FIG. 2.

FIGS. 1 through 3 show a swiftly-assembling collapsible portable frame and partial portions thereof, in accordance with a first embodiment of the present invention. The frame includes a plurality of poles 11 engaged together. Engaged poles 11 are associated with each other with a hinge 16 disposed at a corner region therebetween. One of two engaged poles 11 is provided with a tenon 12 protruding from a first end thereof and the other pole 11 of the two engaged poles 11 is provided with a mortise slot 13 at a second end thereof facing toward the first end. The tenon 12 defines a wedge-shaped slot 121 along an axis of the pole 11 having the tenon 12. An insert pin 15 is engaged to the tenon 12 with a wedge-shaped rib 151 which extends from a bottom of the insert pin 15 and is engaged in the wedge-shaped slot 121. The insert pin 15 has two tabs 152 laterally extending from two side surfaces thereof. The pole 11 with the mortise slot 13 defines two slits 132 in two sidewalls which define the mortise slot 13, for respectively receiving the two ribs 152 therein. The tenon 12 and the insert pin 15 are received in the mortise slot 13.

The frame is advantageously acted as a goal adapted for many kinds of sports and ball games, for example but not limited by soccer, hocket ball, tennis ball and so on. Alternatively, the frame could be any other collapsible portable frame devices, e.g., a tent frame and the likes. In the illustrated embodiment, the frame is a swiftly-assembling collapsible goal 10, and more preferably a football goal 10. The plurality of poles 11 is configured to form a frame of the goal 10.

As shown in FIGS. 1 and 2, the plurality of poles 11 includes two post poles 101, 102, a cross pole 103 connected to and interposed between the two post poles 101, 102, two side bottom poles 104, 105 respectively engaged to the two post poles 101, 102, and a rear pole 106 connected to and interposed between the two side bottom poles 104, 105. Each of the two post poles 101, 102 has a top end and a bottom end facing away from the top end. Two ends of the cross pole 103 are respectively engaged to the top ends of the post poles 101, 102. Each of the two side bottom poles 104(105) has two ends respectively engaged to the bottom end of the post poles 101(102) and an end of the rear pole 106. In generally, a substantially flexible net (not shown) is affixed to the goal 10. In the tent case of the frame, a canvas and the likes may be affixed to the frame.

The two engaged poles 11 of the goal 10 is usefully perpendicularly connected to each other. Each pole 11 is preferably made of a plastic material, for example, PP, PS, etc. The entire hinge 16 is preferably made of a plastic material, for example, PP, PS, etc. As shown in FIGS. 2 and 3, the hinge 16 is provided with a pivot 17 with a bolt or other fasteners. The entire hinge 17 including the pivot 17 and its fasteners is preferably made of a plastic material, for example, PP, PS, etc. The insert pin 15 is preferably made of a plastic material, for example, PP, PS, etc. Accordingly, every member of the entire goal 10 is preferably made of the plastic materials, i.e., no metal material is applied in the goal 10. As such, the goal 10 becomes not only a light-weight and inexpensive device, but also a green environment-friendly product. In fact, many sport equipments (e.g., goals) on the market are more or less made of all kinds of metal materials. Especially for frame structure, most of joint elements are made of metal materials even if their bodies (e.g., pole parts) are made of plastic materials. These athletic equipments (e.g., goal) on the market with metal parts need satisfy current many kinds of directives such as for example EU directives and so on, thereby becoming a trouble and bottleneck in a manufacturing process thereof. Conversely, these shortages are removed from the goal in this embodiment of the present invention with all plastic parts.

FIGS. 2 and 3 illustrate an enlarged structure at a joint region. The tabs 152 are elongated along a direction substantially parallel to the wedge-shaped rib 151. The wedge-shaped rib 151 is elongated along a direction substantially parallel to an axis of the pole 11 which has the tenon 12 and to a flat straight end as shown in FIG. 3. In this structure, since the insert pin 15 is firmly fastened not only to the tenon 12 of one of the two engaged poles 11 via the wedge-shaped rib 151, but also to the other pole 11 of the two engaged poles 11 (see FIGS. 2 and 3) via the tabs 152, the engaged ends of the two engaged poles 11 are induced to little defection or torsion even if one of the two engaged poles 11 is subjected to any external force. In practical application, the goal 10 is usually subjected to a sudden collide and thus the corner region defining between two engaged poles 11 trend to be compressed, this force of collide is applied along a direction perpendicular to the axis of the pole 11. The traditional goal typically has a cranky frame construction. Conversely, in this embodiment, the tabs 152 and the slits 132 elongated along the axis of the poles 11 will form a hinder against the force of collide, thereby keeping the shape of the goal 10 with little shake. Taking the post pole 101 as an example, during training or playing game, the post pole 101 is frequently impacted by user or ball, as a result, the post pole 101 trend to be collapsible towards the side bottom pole 104, but this tendency is impeded by the insert pin 15, thereby achieving a substantial maintenance of original structure of the two poles 101 and 104. Accordingly, such an engaged structure at the corner region between the two engaged poles 11 sufficiently increases stability and security of the goal 10.

In a preferred embodiment, a length of each tab 152 in a direction parallel to the wedge-shaped rib 151 is usefully less than half length of the side surface of the insert pin 15. That is, the tabs 152 is a segment of bar, such as for example a bulge. The length of each tab 152 in a direction parallel to the wedge-shaped rib 151 is preferably more than a quarter length of the side surface of the insert pin 15 for providing an enough fastening force. Further, each tab 152 initially extends from an external end of the insert pin 15 facing away from the tenon 12 in a direction parallel to the wedge-shaped rib 151, that is, the tabs 152 are advantageously disposed approximately to an external end of the insert pin 15 facing away from the tenon 12. In an alternative embodiment, the tabs 152 could be, e.g., disposed at an approximate middle position of the side surfaces of the insert pin 15. In other embodiments, the tabs 152 may optionally be elongated along the entire length of the side surfaces of the insert pin 15. In the illustrated embodiment, the tabs 152 are advantageously disposed approximately to the external end of the insert pin 15 so that a part of the rib 151 is allowed to be kept in the wedge-shaped slot 121 during collapsing and assembling. It means that the insert pin 15 is allowed to be partially drawn away from the mortise slot 13 and just a part of the insert pin 15 with the tabs 152 is drawn out. Accordingly, the more close to the external end of the insert pin 15 the tabs 152 is disposed, the more part of the insert pin 15 is allowed to be kept in the wedge-shaped slot 121 during collapsing and assembling. In this case, the insert pin 15 needs not to be put aside during collapsing and assembling, accordingly decreasing lost possibility and facilitating use of the goal 10. Furthermore, the tabs 152 are preferably disposed at lower edges of two side surfaces of the insert pin 15 so that lower surfaces of the two tabs 152 are coplanar with a bottom surface of the insert pin 15, for improving structural strengthen of the tabs 152. In this structure, the tabs 152 and the rib 151 are substantially seemed to be disposed at an approximate horizontal plane, thereby increasing engagement strengthen between the two engaged poles 11.

The wedge-shaped slot 121 is usefully elongated along an axis of the pole 11 having the tenon 12 and extends through an external end surface of the tenon 12. A bottom width of the wedge-shaped slot 121 is larger than an opening width thereof. A top surface of the wedge-shaped rib 151 facing towards the wedge-shaped slot 121 is in a direct contact with the bottom of the wedge-shaped slot 121. A top width of the top surface of the wedge-shaped rib 151 is larger than a root width of a root portion of the rib 151 which the rib 151 extends from so that the wedge-shaped rib 151 is securely held in the wedge-shaped slot 121, thereby fastening the insert pin 15 to the tenon 12. In an embodiment, a radial cross section of the wedge-shaped slot 121 is tapered from the opening to the bottom thereof, and at the same time a radial cross section of the wedge-shaped rib 151 is tapered from the top surface to the root portion thereof. It is to be understood that the wedge-shaped slot 121 and the wedge-shaped rib 151 could be in other forms than above. For example, the radial cross sections of both the wedge-shaped slot 121 and the wedge-shaped rib 151 are in T-shaped or "+" shapes and the likes. The wedge-shaped rib 151 has about the same length to the wedge-shaped slot 121. The wedge-shaped rib 151 is preferably elongated along the whole axial length of a bottom surface 150 of the insert pin 15 and the wedge-shaped slot 121 is preferably elongated along the whole axial length of a top surface 120 of the tenon 12. The bottom surface 150 of the insert pin 15 is substantially similar to the top surface 120 of the tenon 12 in shape and is in a close contact with the top surface 120. Both the bottom surface 150 of the insert pin 15 and the top surface 120 of the tenon 12 are received in the mortise slot 13. The wedge-shaped rib 151 is advantageously disposed and extends along a center line of the bottom surface 150. The wedge-shaped slot 121 is advantageously disposed and extends along a center line of the top surface 120 of the tenon 12.

In the illustrated embodiment, an end of the pole 11 which defines the mortise slot 13 is bent to be substantially angled with the body of the pole 11. The angle of the bent end with regard to the body of the pole 11 is advantageously 85-100 degrees, more preferably about 90 degrees. The mortise slot 13 is preferably elongated along an axis of the bent end from an end face of the bent end to a spine surface 135 of the bent end facing away from the corner region and is penetrated through the spine surface 135 of the bent end. At the same time, the end of the other pole 11 having the tenon 12 is preferably a flat straight end which is coaxial with the other pole 11. Preferably, the mortise slot 13 is preferably elongated along a direction parallel to the axis of the other pole 11 with the tenon 12 so that the two engaged poles 11 are substantially perpendicular to each other. As such, the bottom of the mortise slot 13 is substantially perpendicular to the pole 11 which defines the mortise slot 13. The two slits 132 are essentially parallel to the bottom of the mortise slot 13 and the axis of the other pole 11 having the tenon 12. Accordingly, when assembling the two engaged poles 11, the axes of the two engaged poles 11 are coplanar and is substantially perpendicular to each other.

The hinge 16 is disposed at the corner region of two engaged poles 11. The spine surface 135 of the bent end is smoothly curved so that two edges of the mortise slot 13 passing through the spine surface 135 are in an arc shape in an axial cross section. As a result, during assembling, the pole 11 with the tenon 12 revolves about the pivot 17 and then the tenon 12 is smoothly inserted into the mortise slot 13 of the other pole 11 until the bottom of the tenon 12 is coincident with the bottom of the mortise slot 13. At the same time, the two tabs 152 of the insert pin 15 which is kept to be engaged to the tenon 12 with the rib 151 slide along the two edges of the mortise slot 13.

The insert pin 15 has an arc surface, which is exposed outside and is in a smooth and seamless transition with the spine surface 135 of the bent end defining the mortise slot 13. That is, after engagement, the arc surface of the insert pin 15 and the spine surface 135 of the bent end cooperatively form a smooth continuous and arcuate outline. The arc surface of the insert pin 15 is usefully provided with a corrugated structure to provide an enough friction, for readily drawing out or pushing the insert pin 15 during collapsing or assembling of the goal 10.

Figure 4:
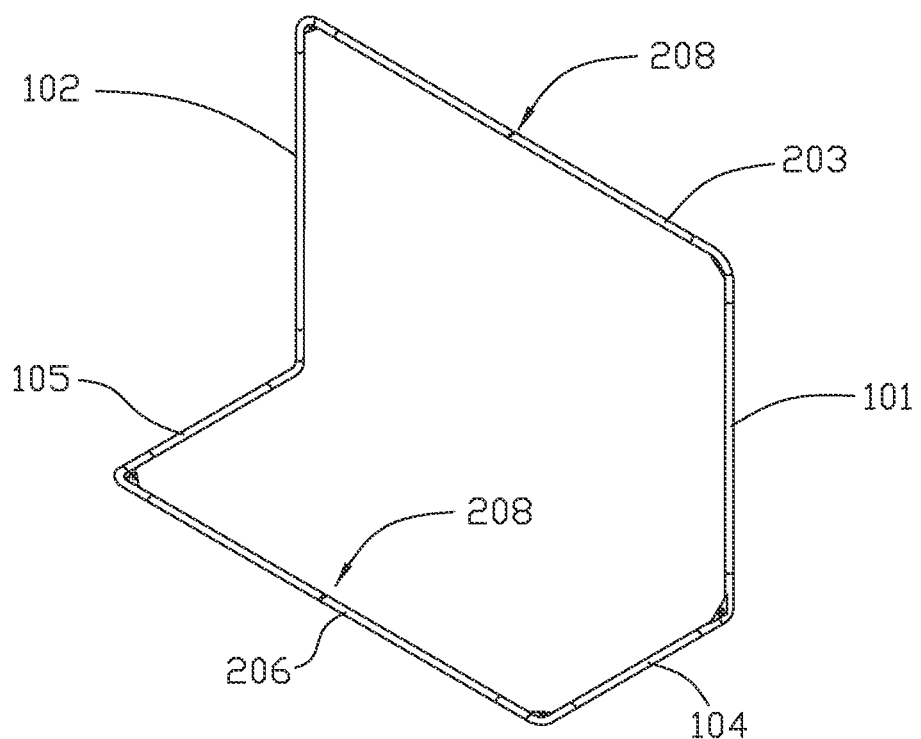
FIG. 4 is a schematic, isometric view of a swiftly-assembling collapsible portable frame according to a second embodiment of the present invention.
Figure 5:
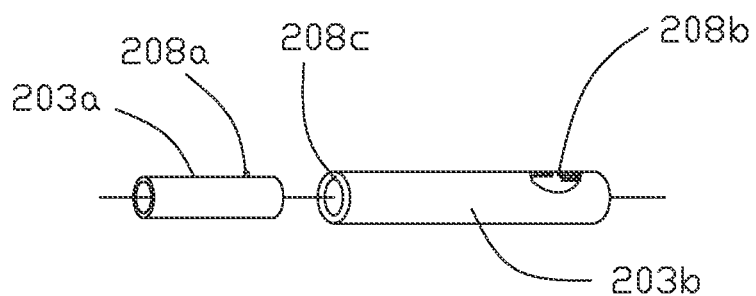
FIG. 5 is a disassembled, enlarged view of a retractable means of a relatively longer pole in FIG. 4.

Referring to FIGS. 4 and 5, which illustrate a swiftly-assembling collapsible goal 20. Likewise, the goal 20 is described hereby as an exemplary of a portable frame in accordance with a second embodiment of the present invention. The goal 20 is essentially similar to the goal 10 in accordance with the first embodiment except that the goal 20 has relatively longer poles. Therefore, these elements shown in FIGS. 4 and 5 which are substantially the same to those of the goal 10 are labeled by the same designation numbers as in FIGS. 1 to 3 and are not repeated below. In this embodiment, the relatively longer poles are mainly a cross pole 203 and a rear pole 206.

The cross pole 203 and the rear pole 206 are respectively similar to the cross pole 103 and the rear pole 106 in material and engagement means, except that the two poles 203 and 206 are respectively provided with a retractable means 208 disposed at an approximately middle thereof. The retractable means 208 mainly includes a projection element and a ring groove around an inner circular surface of a tubular portion of the pole. As shown in FIG. 5, taking the cross pole 203 as an example, the cross pole 203 includes an insert segment 203a and a receiving segment 203b. The receiving segment 203b is advantageously a center hollow structure which has an inner diameter is essentially equal to an outer diameter of the insert segment 203a so that the insert segment 203a can be received in the hollow structure. In the illustrated embodiment, the retractable means 208 includes a ring groove 208a defining at inner circular surface of the receiving segment 203b and a protrusion portion 208b extending from an outer surface of the insert segment 203a. The protrusion portion 208b is disposed adjacent to an insert end of the insert segment 203a facing towards the receiving segment 203b. The ring groove 208a is defined at a distance from a receiving end facing towards the insert segment 203a. The distance confers a retractable scale to the cross pole 203. The inner surface of the receiving segment 203b defines an axial guide groove 208c which is elongated from the receiving end to the ring groove 208a and is in communication with the ring groove 208a, for guiding the protrusion portion 208b to the ring groove 208a. Accordingly, when inserting the insert segment 203a into the receiving segment 203b, the protrusion portion 208b slides along the guide groove 208c and then attains to the ring groove 208. By turning the protrusion portion 208b at a certain angle, the protrusion portion 208b is held in the ring groove 208a, thereby achieving retractable function of the cross pole 203. In an alternative embodiment, the protrusion portion 208b could be a resilient element, accordingly that the guide groove 208c is not required in this case. The protrusion portion 208b may be but not limited by one or more protrusions for improving engagement strengthen. In another alternative embodiment, the retractable means is replaced with a pivot means interposed between the an insert segment 203a and a receiving segment 203b, for achieving a foldable function of the longer pole 203. By means of the retractable means or the pivot means, the longer cross pole 203 is retractable and foldable so that its size can be changed to be adapted for overlapping together with other shorter poles. This is useful for further decreasing the size of the collapsed goal and provides a convenience of carriage of the goal.

Referring back to FIGS. 1 and 4, to collapse the goal 10, the insert pin 15 is partially removed from the mortise slot 13, that is, the entire tabs 152 is released from the slits 132 and part of the rib 151 is received in the wedge-shaped slot 121. Without restriction of the insert pin 15, it is allowed that each pair of engaged poles 11 rotates relative to each other around the pivot 17 of the hinge 16 to approximately overlap the two engaged poles 11 relative to each other. In the illustrated embodiment as shown in FIG. 1, firstly, the post pole 101 (102) and the side bottom pole 104(105) are preferably folded relative to each other. Then, the post poles 101, 102 and the cross pole 103 are respectively folded relative to each other and at the same time the side bottom poles 104, 105 and the rear pole 106 are respectively folded relative to each other. In the above second embodiment, prior to folding of the shorter post poles, the longer poles 203, 206 are telescoped or folded in half to facilitate folding of other relatively shorter poles. After finishing folding of all the poles, the insert pin 15 is pushed back to the tenon 12 with the entire rib 151 received in the wedge-shaped slot 121. Thus, in fact, no one member is separated from each other although the goals 10, 20 are collapsed and compact. After collapsing of all the poles, the goals 10, 20 are compacted as about a long size of one pole (especially a shorter pole) and all the poles are substantially overlapped together, thereby facilitating carriage of the goals 10, 20. Accordingly, goals 10, 20 are as compact as possible to be put aside and are to be able to vary the size thereof.

Figure 6:
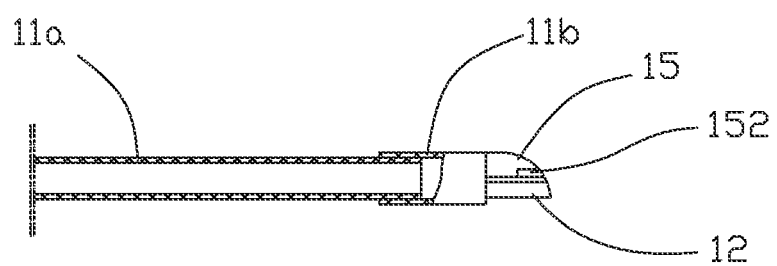
FIG. 6 is a schematic, cut-away view of another kind of pole of the swiftly-assembling collapsible portable frame according to an alternative embodiment of the present invention.

In some embodiments, all the poles 11 is tubular structure, i.e., have a center hollow structure. In an alternative embodiment, as shown in FIG. 6, each pole 11 includes a hollow body 11a and two connection ends 11b. FIG. 6 exemplarily shows half the hollow body 11a and one connection end 11b. The two connection ends 11b both have a center hollow structure configured for respectively inserting an end of the hollow body 11a therein. It is to be understood that one of the two connection ends 11b is provided with the tenon 12 (shown in FIG. 6) and the other connection end 11b defines the mortise slot 13. The hollow body 11a is preferably a tubular structure for decreasing weight and cost of the pole 11. A free distal of the connection ends 11b is preferably hermetical or solid for forming the tenon 12 or defining the mortise slot 13. It is to be appreciated that a pair of hinged connection ends 11b having the tenon 12 and the mortise slot 13 cooperatively forms a corner connection assembly for connecting two adjoined hollow bodies 11a. Accordingly, a length of the hollow body 11a can be varied in accordance with actual demands. As shown in FIG. 6, the pin 15 is partially engaged to the tenon 12, i.e., the two tabs 152 are free away from tenon 12 while a part of the rib 151 is held in the wedge-shape slot 121.

In use, the collapsed goals 10, 20 need to be expanded. Firstly, the insert pin 15 is at least partially removed from the mortise slot 13, such as for example, the entire tabs 152 is removed from the slits 132. The pole 11 having the tenon 12 rotates about the pivot 17 relative to the other pole 11 with the slot 13 whilst the tenon 12 is inserted into the mortise slot 13. During rotation of the pole 11, the tabs 152 slide along the spine surface 135. Then, the tabs 152 of the insert pin 15 is push into the slits 132 and the rib 151 slides into the wedge-shape slot 121 when the two engaged poles 11 rotate relative to each other at a predetermined position where the two engaged poles 11 is substantially perpendicular to each other. The bottom surface of the tenon 12 directly contacts with the bottom of the mortise slot 13. According to the above process, all the poles 11 are expanded and thus frames of the goals 10, 20 are constructed. In the case of the second embodiment, the longer retractable poles 203, 206 could be initially elongated, or in the alternative second embodiment, the longer poles which are foldable in half are initially expanded.

As described above, in the above swiftly-assembling collapsible goals 10, 20 (i.e., exemplary products of the frame), the poles 11 are engaged with the tenon 12 and the mortise slot 13 and are further firmly secured together with the insert pin 15. The insert pin 15 is engaged to the tenon 12 with the wedge-shaped rib 151 in the wedge-shaped slot 121 of one pole 11 and is engaged to the other pole 11 with the two tabs 152 in the two slits 132. As such, the two poles 11 are firmly engaged together without any shift or offset due to a restrain action of the insert pin 15. Thus, the goal 10 can keep its shape even when being subjected to a sudden push or body violence. Prior to assembling the swiftly-assembling collapsible goals 10, 20 (or frame 10), the entire or part of insert pin 15 is kept to be drawn away from the wedge-shaped slot 121, then the tenon 12 optionally affixed with the insert pin 15 is aimed and inserted into the mortise slot 13. Then the poles 11 are wrenched to attain given sites, the insert pin 15 is pushed back into mortise slot 13, accordingly achieving the assembling of the goal or the frame. When collapsing the goal or the frame, the entire or part of insert pin 15 is kept to be drawn away from the wedge-shaped slot 13, and then every pair of adjacent two poles is wrenched to be in an approximately overlapped-shape, and accordingly the goal or the frame is compacted.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A swiftly-assembling collapsible goal comprises:
a plurality of poles engaged together to form a frame of the goal, engaged poles being associated with each other with a hinge disposed at a corner region therebetween, one of two engaged poles being provided with a tenon protruding from a first end thereof and the other pole of the two engaged poles being provided with a mortise slot at a second end of the other pole facing toward the first end, the tenon defining a wedge-shaped slot along an axis of the pole having the tenon, an insert pin being engaged to the tenon with a wedge-shaped rib which extends from a bottom of the insert pin and is engaged in the wedge-shaped slot, the insert pin having two tabs laterally extending from two side surfaces thereof, the pole with mortise slot defining two slits in two sidewalls which define the mortise slot, the two slits being configured for respectively receiving the two ribs therein, the tenon and the insert pin being received in the mortise slot and wherein an end of the pole which defines the mortise slot is bent to be substantially angled with the body of the pole, the mortise slot being elongated along an axis of the bent end from an end face of the bent end to a spine surface of the bent end which faces away from the corner region, the mortise slot being penetrated through the spine surface of the bent end.

2. The goal as claimed in claim 1, wherein the tabs are elongated along a direction substantially parallel to the wedge-shaped rib and the wedge-shaped rib is elongated along a direction substantially parallel to an axis of the pole with the tenon, a length of each tab in a direction parallel to the wedge-shaped rib being less than half length of the side surface of the pin and being more than a quarter length of the side surface of the insert pin.

3. The goal as claimed in claim 1, wherein a bottom width of the wedge-shaped slot is larger than an opening width thereof, a top surface of the wedge-shaped rib facing towards the wedge-shaped slot contacting with the bottom of the wedge-shaped slot, a top width of the top surface of the wedge-shaped rib being larger than a root width of a root portion of the rib which the rib extends from.

4. The goal as claimed in claim 1, wherein each pole comprises a hollow body and two connection ends which both have a center hollow structure configured for respectively inserting two ends of the hollow body, one of the two connection ends being provided with the tenon while the other connection end defining the mortise slot.

5. The goal as claimed in claim 1, wherein a bottom of the mortise slot is substantially perpendicular to the pole which defines the mortise slot and the two slits are essentially parallel to both the bottom of the mortise slot and the axis of the pole having the tenon.

6. The goal as claimed in claim 1, wherein the spine surface of the bent end is smoothly curved and two edges of the mortise slot passing through the spine surface are in an arc shape in an axial cross section so that the insert pin is partially kept to be engaged to the tenon with the rib and the two tabs slide along with the two edges of the mortise slot during assembling.

7. The goal as claimed in claim 1, wherein the plurality of poles includes at least one longer pole which has one of a retractable means and a foldable means.

8. The goal as claimed in claim 1, wherein the tabs are disposed at lower edges of two side surfaces of the insert pin so that lower surfaces of the two tabs are essentially coplanar with a bottom surface of the insert pin, each tab initially extending from an external end of the insert pin facing away from the tenon in a direction parallel to the wedge-shaped rib.

9. The goal as claimed in claim 1, wherein every member of the goal is made of a plastic material.

10. A swiftly-assembling portable collapsible frame comprises:
a plurality of poles engaged together associated with each other with a hinge disposed at a corner region therebetween, one of two engaged poles being provided with a tenon protruding from a first end thereof and the other pole of the two engaged poles being provided with a mortise slot at a second end of the other pole facing toward the first end, the tenon defining a wedge-shaped slot along an axis of the pole, an insert pin being engaged to the tenon with a wedge-shaped rib engaged in the wedge-shaped slot, the insert pin having two tabs laterally extending from two side surfaces thereof, the pole with mortise slot defining two slits in two sidewalls which define the mortise slot, the two slits being configured for respectively receiving the two ribs therein, the tenon and the insert pin being received in the mortise slot and wherein an end of the pole which defines the mortise slot is bent to be substantially angled with the body of the pole, the mortise slot being elongated along an axis of the bent end from an end face of the bent end to a spine surface of the bent end which faces away from the corner region, the mortise slot being penetrated through the spine surface of the bent end.

11. The frame as claimed in claim 10, wherein the tabs are elongated along a direction substantially parallel to the wedge-shaped rib and the wedge-shaped rib is elongated along a direction substantially parallel to an axis of the pole with the tenon, a length of each tab in a direction parallel to the wedge-shaped rib being less than half length of the side surface of the pin and being more than a quarter length of the side surface of the insert pin.

12. The frame as claimed in claim 10, wherein a bottom width of the wedge-shaped slot is larger than an opening width thereof, a top surface of the wedge-shaped rib facing towards the wedge-shaped slot contacting with the bottom of the wedge-shaped slot, a top width of the top surface of the wedge-shaped rib being larger than a root width of a root portion of the rib which the rib extends from.

13. The frame as claimed in claim 10, wherein a radial cross section of the wedge-shaped slot is tapered from the opening to the bottom thereof and a radial cross section of the wedge-shaped rib is tapered from the top surface to the root portion thereof.

14. The frame as claimed in claim 10, wherein a bottom of the mortise slot is substantially perpendicular to the pole which defines the mortise slot and the two slits are essentially parallel to both the bottom of the mortise slot and the axis of the pole having the tenon.

15. The frame as claimed in claim 10, wherein the spine surface of the bent end is smoothly curved and two edges of the mortise slot passing through the spine surface are in an arc shape in an axial cross section so that the insert pin is partially kept to be engaged to the tenon with the rib and the two tabs slide along with the two edges of the mortise slot during assembling.

16. The frame as claimed in claim 10, wherein the plurality of poles includes at least one longer pole which has one of a retractable means and a foldable means.

17. The frame as claimed in claim 10, wherein the tabs are disposed at lower edges of two side surfaces of the insert pin so that lower surfaces of the two tabs are essentially coplanar with a bottom surface of the insert pin, each tab initially extending from an external end of the insert pin facing away from the tenon in a direction parallel to the wedge-shaped rib.

18. The frame as claimed in claim 10, wherein every member of the frame is made of a plastic material.

* * * * *